United States Patent
Johansson et al.

(10) Patent No.: US 10,230,667 B2
(45) Date of Patent: *Mar. 12, 2019

(54) PRE-SORTER SYSTEMS AND METHODS FOR DISTRIBUTING GTP PACKETS

(71) Applicant: Anue Systems, Inc., Austin, TX (US)

(72) Inventors: Stefan Johansson, Round Rock, TX (US); Robin O'Connor, Austin, TX (US)

(73) Assignee: Keysight Technologies Singapore (Holdings) Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,428

(22) Filed: May 31, 2016

(65) Prior Publication Data

US 2016/0277321 A1 Sep. 22, 2016

Related U.S. Application Data

(63) Continuation of application No. 14/108,513, filed on Dec. 17, 2013, now Pat. No. 9,380,002.

(51) Int. Cl.
*H04W 40/00* (2009.01)
*H04L 12/947* (2013.01)
*H04L 29/08* (2006.01)

(52) U.S. Cl.
CPC ............ *H04L 49/25* (2013.01); *H04L 69/325* (2013.01)

(58) Field of Classification Search
CPC ... H04L 49/25; H04L 49/1507; H04L 49/255; H04L 49/256; H04W 40/00
See application file for complete search history.

(56) References Cited

U.S. PATENT DOCUMENTS

| | | |
|---|---|---|
| 6,480,488 B1 | 11/2002 | Huang |
| 7,340,744 B2 | 3/2008 | Chandwadkar et al. |
| 7,373,412 B2 | 5/2008 | Colas et al. |
| 7,421,506 B2 | 9/2008 | Ni et al. |

(Continued)

OTHER PUBLICATIONS

Ixia Network Visibility Solutions, Anue GTP Session Controller 7433, Product Specifications, Document No. 915-6504-01 Rev. B, May 2013, 3 pgs.

(Continued)

*Primary Examiner* — Lan-Huong Truong (57) ABSTRACT

Pre-sorter systems and methods are disclosed for distributing GTP packets. The pre-sorter forwards GTP packets based upon entries within one or more pre-sort tables, and the entries associate F-TEIDs with output ports that can be coupled to GTP sessions controllers and/or other external systems. The F-TEIDs represent a combination of a destination IP address and a tunnel endpoint identifier (TEID) for each GTP packet. For some embodiments, GTP session controllers analyze the GTP packets and determine F-TEIDs that are created, modified, and/or dropped for user sessions, and the GTP session controllers send control messages to the pre-sorter to determine the entries stored within the pre-sort table(s). For other embodiments, other external systems such as network monitoring tools are coupled to the GTP packet pre-sorter rather than GTP session controllers. Pre-sorters having multiple pre-sort modules with local pre-sort tables, as well as two-stage pre-sort architectures, can also be used.

17 Claims, 7 Drawing Sheets

(56) References Cited

U.S. PATENT DOCUMENTS

| | | | |
|---|---|---|---|
| 8,270,942 B2 | 9/2012 | Zabawskyj et al. | |
| 8,457,126 B2* | 6/2013 | Breslin | H04L 45/00 |
| | | | 370/390 |
| 8,514,756 B1 | 8/2013 | Ramachandra et al. | |
| 8,902,754 B2* | 12/2014 | Ali | H04L 43/12 |
| | | | 370/235 |
| 8,929,356 B2 | 1/2015 | Pandey et al. | |
| 9,298,560 B2* | 3/2016 | Janakiraman | H04L 43/12 |
| 2008/0031141 A1 | 2/2008 | Lean et al. | |
| 2011/0286461 A1 | 11/2011 | Ichino et al. | |
| 2012/0082073 A1* | 4/2012 | Andreasen | H04L 12/4633 |
| | | | 370/310 |
| 2012/0236823 A1* | 9/2012 | Kompella | H04W 24/04 |
| | | | 370/331 |
| 2013/0054761 A1* | 2/2013 | Kempf | H04L 12/4633 |
| | | | 709/220 |
| 2013/0265883 A1* | 10/2013 | Henry | H04L 43/0876 |
| | | | 370/241 |
| 2013/0272136 A1* | 10/2013 | Ali | H04W 24/08 |
| | | | 370/241 |
| 2015/0172219 A1 | 6/2015 | Johansson et al. | |

OTHER PUBLICATIONS

Ixia Anue GTP Session Controller, Take Control of GTP Monitoring to Improve Customer QoE and Maximize Network ROI, Solution Brief, Document No. 915-6606-01 Rev. A, Sep. 2013, 2 pgs.

\* cited by examiner

PRE-SORTER SYSTEMS AND METHODS FOR DISTRIBUTING GTP PACKETS

RELATED APPLICATIONS

This application is a continuation application of U.S. patent application Ser. No. 14/108,513, filed Dec. 17, 2013, and entitled "PRE-SORTER SYSTEMS AND METHODS FOR DISTRIBUTING GTP PACKETS," which is hereby incorporated by reference in its entirety.

TECHNICAL FIELD OF THE INVENTION

This invention relates to communication systems that use GTP (GPRS (General Packet Radio Service) Tunneling Protocol) packets and, more particularly, to managing sessions for user equipment within such communication systems.

BACKGROUND

For certain communication systems, network packets are communicated using GTP (GPRS (General Packet Radio Service) Tunneling Protocol) packets. User equipment (UE), such as mobile cellular handsets, can have multiple active sessions at a time. To manage these GTP communication sessions, it is often desirable to have visibility into what sessions are active for each UE. For example, a network monitoring tool may desired to receive all packets associated with a particular user. Tracking active sessions, however, is difficult because sessions are constantly being created and torn down.

GTP packets are often classified by their F-TEID. An F-TEID is a combination of the destination IP address and the GTP tunnel endpoint identifier (TEID) included within the GTP packet. The F-TEID can be used to determine to which user session a GTP packet belongs. However, because F-TEIDs are dynamically allocated and will change over time, an F-TEID can be used by one session for one user and can later be re-used by a different session for a different user. As such, it is difficult over time to determine which packets should be associated with which user sessions based upon F-TEIDs.

A GTP sessions controller (GSC) can be used to identify and track user sessions and related F-TEIDs so that packets associated with a user session can be forwarded to a common network monitoring tool. To achieve this result, a GSC typically receives all of the control packets (GTP-C) and user packets (GTP-U) associated with a user to correctly track changes to sessions and determine which F-TEIDs are associated with which user sessions. As a GSC will typically have a limited capacity in terms of users and sessions, communication systems with large numbers of users may require multiple GSCs to track packets and sessions for these users. However, because F-TEIDs are dynamically allocated and change over time, the use of multiple GSCs creates significant problems with respect to making sure all packets associated with a particular user are received by the appropriate GSC so that this GSC can be forward these user packets to the same network monitoring tool.

One solution to this problem is to forward all incoming GTP packets to each GSC being used within a system of multiple GSCs. As such, each GSC can then identify GTP packets having F-TEIDs associated with sessions for users it is tracking and can discard GPT packets having F-TEIDs for other non-tracked sessions. However, this solution creates large volumes of redundant packet traffic as each GSC must receive all of the GTP packets. As such, this solution does not scale efficiently.

SUMMARY OF THE INVENTION

Systems and methods are disclosed for pre-sorter systems and methods for distributing GTP (GPRS (General Packet Radio Service) Tunneling Protocol) packets to multiple GTP session controllers and/or other external systems such as network monitoring tools. The pre-sorter forwards GTP packets based upon entries within one or more pre-sort tables, and the entries associate F-TEIDs with output ports for the pre-sorter that can be coupled to GTP session controllers and/or other external systems. The F-TEIDs represent a combination of a destination IP address and a tunnel endpoint identifier (TEID) for each GTP packet. In part, the disclosed pre-sorter embodiments allow for efficient scaling of GTP session controllers for communication systems handling large numbers of concurrent users. The GTP session controllers analyze the GTP packets and determine F-TEIDs that are created, modified, and/or dropped for user sessions, and the GTP session controllers send control messages to the pre-sorter to determine the entries stored within the pre-sort tables. In further embodiments, other external systems such as network monitoring tools are coupled to the GTP packet pre-sorter rather than GTP session controllers, and these external systems analyze packets and send the control messages to the pre-sorter to determine the entries stored within the pre-sort tables. In addition, multiple pre-sort modules can be used that store entries within local pre-sort tables. Still further, module selectors can be used to evenly distribute incoming GTP packets among the pre-sort modules based upon a common selection algorithm, such as a hash algorithm and/or some other desired selection algorithm. Different features and variations can be implemented, as desired, and related systems and methods can be utilized, as well.

For one disclosed embodiment, a system for distributing GTP packets includes a pre-sorter and a plurality of external systems. The pre-sorter is configured to determine F-TEIDs for incoming GTP packets and to forward GTP packets to output ports for the pre-sorter based upon entries within at least one pre-sort table, where the entries associate F-TEIDs with the output ports and where each F-TEID represents a combination of a destination IP address and a tunnel endpoint identifier (TEID) for a GTP packet. And the external systems are configured to analyze GTP packets to determine F-TEIDs for the GTP packets associated with tracked user sessions and to send control messages to the pre-sorter to at least in part determine the entries stored within the at least one pre-sort table.

In further embodiments, the external systems include a plurality of GTP session controllers coupled to the output ports and configured to distribute GTP packets received from the pre-sorter to a plurality of additional external systems. In addition, the external systems can be a plurality of monitoring tools coupled to the output ports. Further, the external systems can be further configured to send control messages to the pre-sorter to delete entries in the at least one pre-sort table.

In other embodiments, the pre-sorter can include a plurality of pre-sort modules configured to receive GTP packets, and the at least one pre-sort table can include a plurality of local pre-sort tables with at least one local pre-sort table being associated with each of the pre-sort modules. Further, each control message can be received by each pre-sort module to store entries for all F-TEIDs associated with the external system. In other embodiments, the pre-sorter can further include a plurality of module selectors, and each module selector can be configured to receive GTP packets from at least one source of a plurality of sources coupled to the pre-sorter and to select pre-sort modules to receive the GTP packets based upon contents of the GTP packets. Still further, the module selectors can be configured to apply a common selection algorithm to select the pre-sort modules. Also, the external systems can be configured to apply the common selection algorithm to select which pre-sort modules receive its control messages.

For another disclosed embodiment, a pre-sorter for distributing GTP packets includes a plurality of input ports configured to receive GTP packets, a plurality of output ports configured to output GTP packets, at least one pre-sort table having entries associating F-TEIDs with the output ports where each F-TEID represents a combination of a destination IP address and a tunnel endpoint identifier (TEID) for a GTP packet, and at least one controller configured to determine F-TEIDs for received GTP packets and to determine the output ports to receive the GTP packets based upon the pre-sort table, where the entries within the pre-sort tables are determined at least in part by control messages received from external systems coupled to the pre-sorter.

In further embodiments, the pre-sorter can include a plurality of pre-sort modules configured to receive the GTP packets from the plurality of input ports. The at least one pre-sort table can include a plurality of local pre-sort tables with at least one local pre-sort table being associated with each of the pre-sort modules. And the at least one controller can include a plurality of module controllers with at least one module controller being associated with each of the pre-sort modules. Further, the pre-sorter can include a switch fabric coupled between the plurality of pre-sort modules and the plurality of output ports. Also, the local pre-sort tables can each be configured to store entries for all F-TEIDs associated with the output ports. In addition, each pre-sort module can further include a selector configured to select an output port to receive a GTP packet indicating creation of a new session.

In still further embodiments, the pre-sorter can include a plurality of module selectors configured to receive GTP packets from the input ports, and each module selector can be configured to select pre-sort modules to receive the GTP packets based upon contents of the GTP packets. In addition, the module selectors can be configured to apply a common selection algorithm to select the pre-sort modules. Also, the local pre-sort tables can each be configured to store entries for a subset of F-TEIDs associated with the output ports. Still further, the pre-sorter can include a switch fabric coupled between the plurality of module selectors and the plurality of pre-sort modules. In other embodiments, the pre-sorter can include a non-volatile storage medium configured to store the entries for the at least one pre-sort table.

For a further disclosed embodiment, a method for distributing GTP packets includes receiving GTP packets with a pre-sorter having a plurality of output ports, determining F-TEIDs for the GTP packets within the pre-sorter where each F-TEID represents a combination of a destination IP address and a tunnel endpoint identifier (TEID) for a GTP packet, identifying the output ports to receive the GTP packets based upon entries within at least one pre-sort table within the pre-sorter where the entries associate F-TEIDs with the output ports, forwarding the GTP packets to the output ports, receiving control messages from a plurality of external systems coupled to the output ports for the pre-sorter, and using the control messages within the pre-sorter to at least in part determine the entries stored within the pre-sort table.

In additional embodiments, the control messages can be received from a plurality of monitoring tools coupled to the output ports. In addition, the control messages can be received from a plurality of GTP session controllers coupled to the output ports and configured to distribute GTP packets to a plurality of additional external systems.

In further embodiments, the determining and identifying steps can be performed by a plurality of pre-sort modules, and the at least one pre-sort table can include a plurality of local pre-sort tables with at least one local pre-sort table being associated with each of the pre-sort modules. In addition, each control message can be received by each pre-sort module to store entries for all F-TEIDs associated with the output ports. Further, the method can further include distributing the received GTP packets to the plurality of pre-sort modules based upon a common selection algorithm. Still further, the control messages can be received by specific pre-sort modules based upon the common selection algorithm applied by the external systems.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Systems and methods are disclosed for pre-sorter systems and methods for distributing GTP (GPRS (General Packet Radio Service) Tunneling Protocol) packets to multiple GTP session controllers and/or other external systems such as network monitoring tools. The pre-sorter forwards GTP packets based upon entries within one or more pre-sort tables, and the entries associate F-TEIDs with output ports for the pre-sorter that can be coupled to GTP session controllers and/or other external systems. The F-TEIDs represent a combination of a destination IP address and a tunnel endpoint identifier (TEID) for each GTP packet. In part, the disclosed pre-sorter embodiments allow for efficient scaling of GTP session controllers for communication systems handling large numbers of concurrent users. The GTP session controllers analyze the GTP packets and determine F-TEIDs that are created, modified, and/or dropped for user sessions, and the GTP session controllers send control messages to the pre-sorter to determine the entries stored within the pre-sort tables. In further embodiments, other external systems such as network monitoring tools are coupled to the GTP packet pre-sorter rather than GTP session controllers, and these external systems analyze packets and send the control messages to the pre-sorter to determine the entries stored within the pre-sort tables. In addition, multiple pre-sort modules can also be used that store entries within local pre-sort tables. Still further, module selectors can be used to evenly distribute incoming GTP packets among the pre-sort modules based upon a common selection algorithm, such as a hash algorithm and/or some other desired selection algorithm. Different features and variations can be implemented, as desired, and related systems and methods can be utilized, as well.

As described herein, intelligent pre-sorter systems and methods are used to distribute GTP packets for multiple users across multiple output ports to external systems such as GTP session controllers, network monitoring tools, and/or other external systems. The pre-sorter embodiments described herein determine which GTP packets to send to which GTP session controller (GSC), network monitoring tool, or external system so that all packets for a given user can be sent to the same destination. For the GSC embodiments, the GSC receiving the user packets can then send these user packets to a common network tool that is connected to the GSC. The pre-sorter embodiments described herein can be implemented using lookup tables and packet switching.

Figure 1:
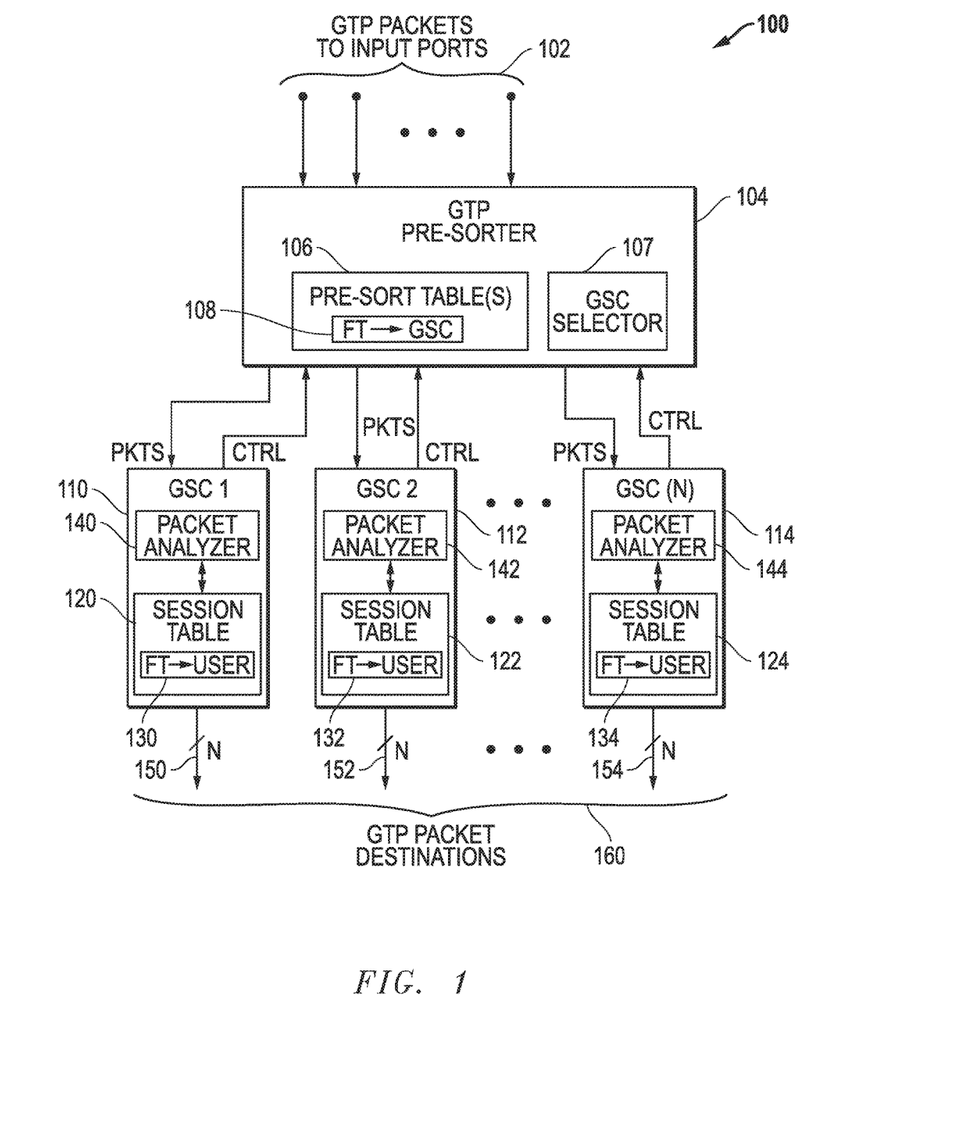
FIG. 1 is a block diagram of an example embodiment for a system including a pre-sorter that distributes GTP (GPRS (General Packet Radio Service) Tunneling Protocol) packets to multiple GTP session controllers based upon entries in one or more pre-sort tables.
Figure 3:
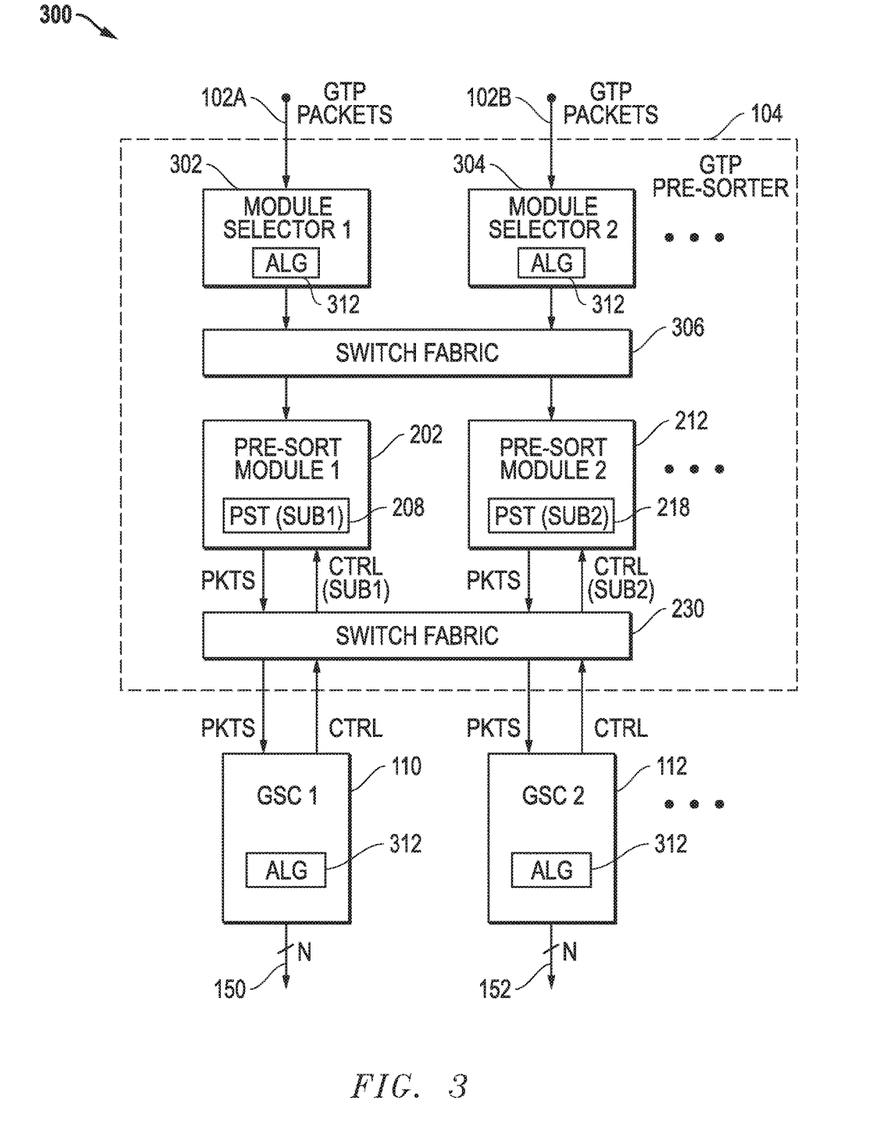
FIG. 3 provides an example embodiment for a two-stage pre-sorter that utilizes module selectors to determine which pre-sort modules will receive incoming GTP packets.
Figure 4:
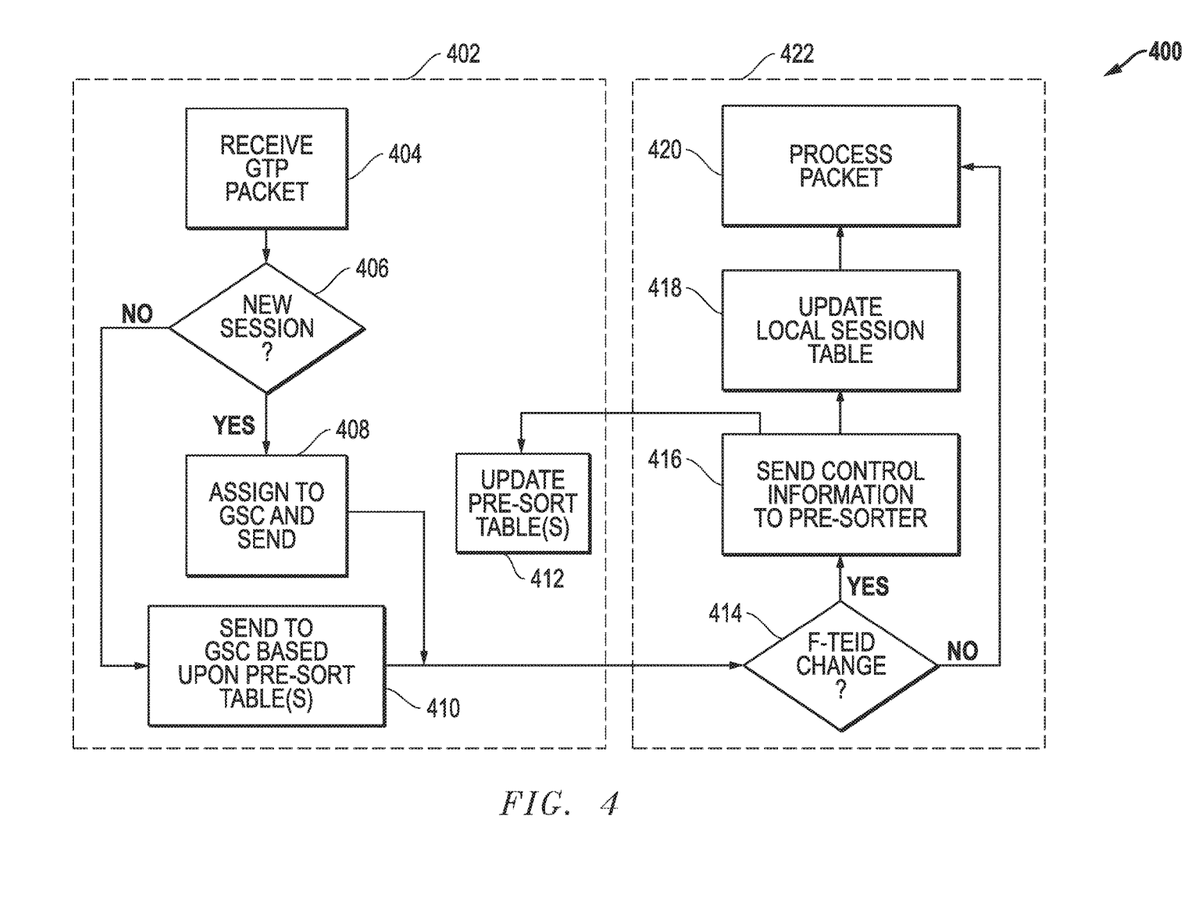
FIG. 4 is a flow diagram of an example embodiment for pre-sorting GTP packets that are distributed to multiple GTP session controllers.
Figure 5:
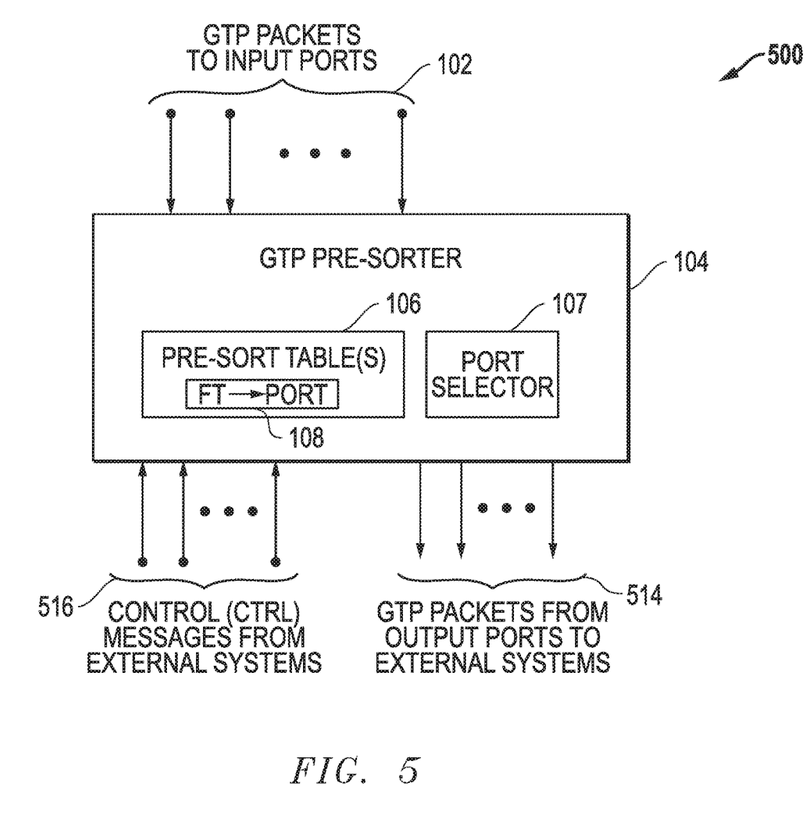
FIG. 5 is a block diagram of an example embodiment for a system including a pre-sorter that distributes GTP packets to multiple output ports based upon one or more pre-sort tables.
Figure 6:
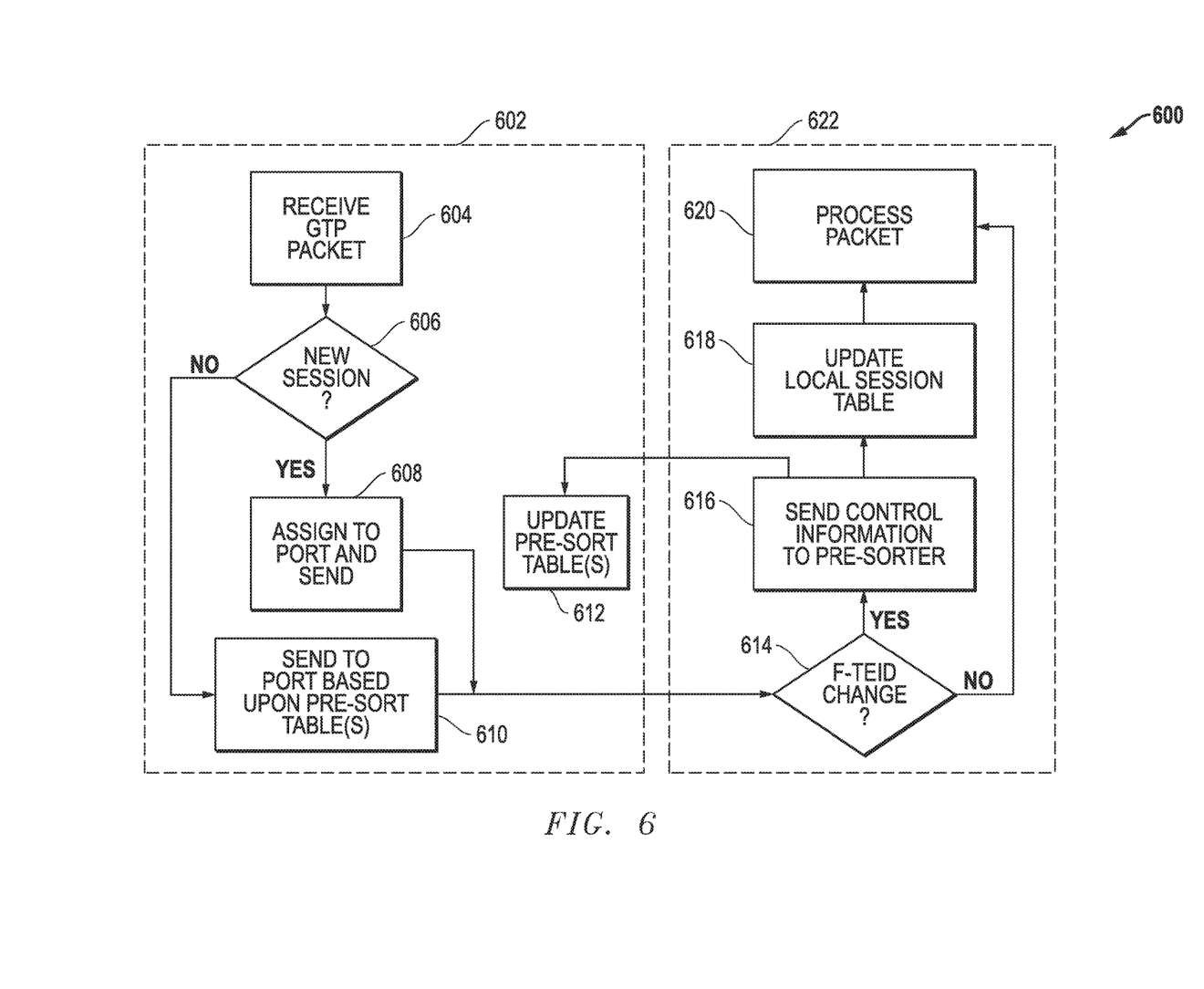
FIG. 6 is a flow diagram of an example embodiment for pre-sorting GTP packets that are distributed to external systems.
Figure 7:
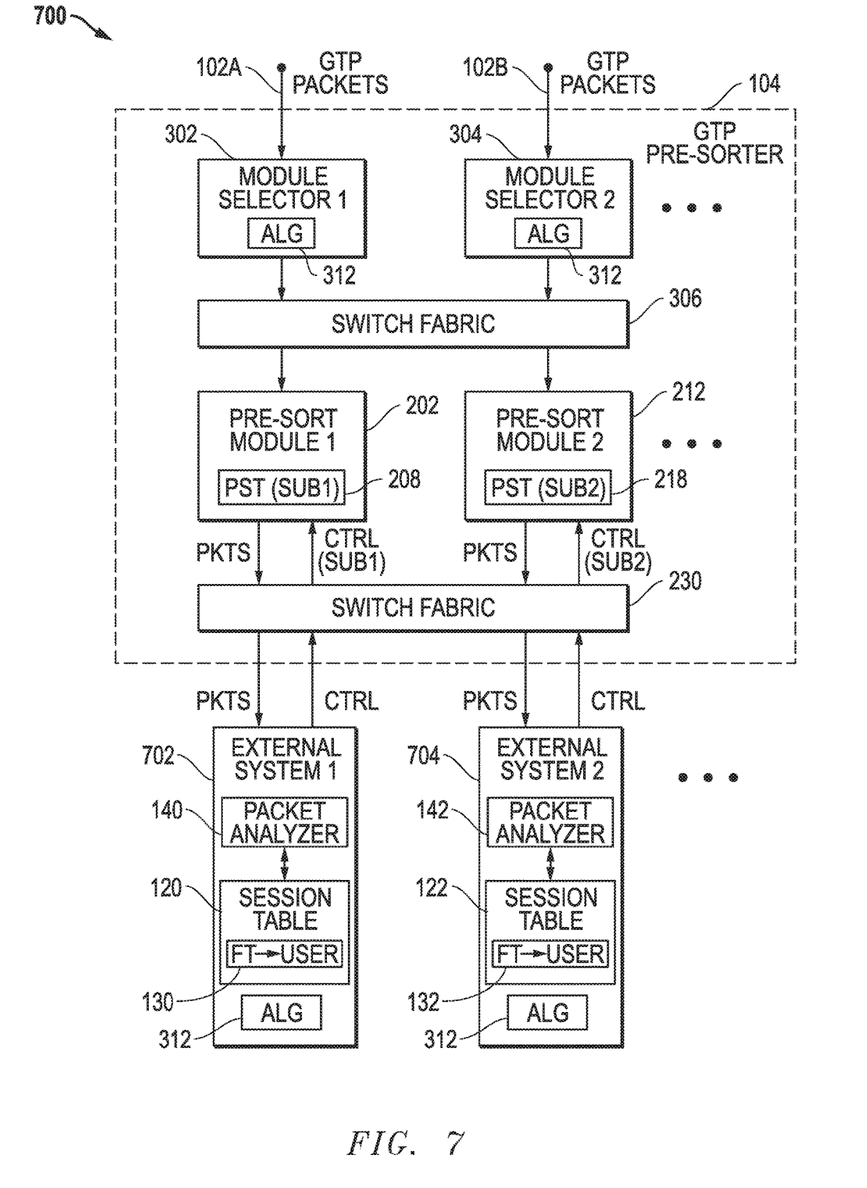
FIG. 7 is block diagram of an example embodiment for a system including a GTP pre-sorter that distributes GTP packets to multiple output ports coupled to multiple external systems.

As shown with respect to FIG. 1, one or more pre-sort lookup table(s) have an entry for each F-TEID created for a user, and these F-TEIDs are used to determine which GSC should receive the packet. The GSCs themselves provide control messages back to the pre-sorter to determine the F-TEID entries. To further facilitate scalability, the pre-sorter can be implemented in several independent pre-sort modules followed by a switch fabric, as shown with respect to FIG. 2. Because the F-TEIDs are constantly changing, the pre-sort tables are modified continuously by sending control messages from each of the GSCs to the pre-sorter with information on how to update the pre-sort lookup tables. For the embodiment of FIG. 2, each of the pre-sort modules receives updates from every GSC. FIG. 3 provides a further implementation where a two-stage pre-sorter is used to reduce the size of the local pre-sort tables within the pre-sort modules. The first stage of this two-stage pre-sorter uses a selection algorithm to evenly distribute GTP packets among the different pre-sort modules. FIG. 4 provides an example flow diagram for pre-sorting GTP packets to efficiently scale multiple GSC session controllers. FIG. 5 provides a more general embodiment where the pre-sorter distributes GTP packets to output ports that are coupled to external systems. FIG. 6 provides a related example flow diagram. And FIG. 7 provides an example embodiment where multiple external systems are coupled to the pre-sorter. Further variations could also be implemented, as desired, while still utilizing GTP packet pre-sorting as described herein to facilitate the scaling of multiple GTP session controllers.

FIG. 1 is a block diagram of an example embodiment for a system 100 including a GTP pre-sorter 104 that distributes GTP packets to multiple GSCs 110, 112 . . . 114 based upon entries in one or more pre-sort tables 106. The GSC per-sorter 104 receives GTP packets 102 from one or more sources coupled to input ports for the GTP pre-sorter 104. The GTP packets will include user packets (GTP-U) and control packets (GTP-C). For new user sessions, a GTP-C packet will include an international mobile subscriber identity (IMSI). The GTP pre-sorter 104 analyzes the incoming GTP-C packets. If an IMSI is detected indicating a new user session, the GTP pre-sorter 104 uses the GSC selector 107 to select one of the GSCs 110, 112 . . . 114 to receive this new user session. As described herein, entries in the pre-sort table(s) 106 are added and updated based upon control messages sent by the GSCs 110/112/114 to the GTP pre-sorter 104. When a subsequent packet is received, the GTP pre-sorter 104 determines the F-TEID for the received GTP packet and accesses the pre-sort table(s) 106 to determine the GSC associated with this F-TEID. It is noted that the GSC selector 107 can utilize a load balancing algorithm to select the GSC to receive a new user session. For example, the GSC selector 107 can use a rotating list to select each GSC in sequence and then rotate back to first GSC once the last one has been reached. Other variations could also be implemented.

The GSCs 110/112/114 receive GTP packets (PKTS) from the GTP pre-sorter 104, analyze these packets, and determines new F-TEIDs for these GTP packets. The GSCs 110/112/114 then send back a control message (CTRL) that adds, modifies, and/or updates the entries 108 stored in the pre-sort table(s) 106 that associate F-TEIDs with GSCs 110/112/114. The GSCs 110/112/114 use session tables 120, 122 . . . 124 to store entries 130, 132 . . . 134 that keep track of which F-TEIDs are associated with the user sessions they are tracking. In particular, the first GSC (GSC1) 110 receives packets distributed to it from the GTP pre-sorter 104 and analyzes those packets using packet analyzer 140 to determine F-TEIDs associated with each user. For example, the packet analyzer 140 within the first GSC 110 analyzes GTP-C packets it receives to determine when user sessions are created, modified, and/or dropped and thereby tracks modifications to user sessions it is handling. The packet analyzer 140 also determines F-TEIDs for these GTP packets and stores entries 130 in the session table 120 that associate F-TEIDs with user sessions. The first GSC 110 can then use the session table 120 to send packets having F-TEIDs associated with a particular user session to a specific output port within the N different output ports 150 for the first GSC 110. The second GSC (GSC2) 112 operates similarly to the first GSC 110 and includes packet analyzer 142, output ports 144, and session table 122 having entries 132. Additional GSCs can also be included, as represented by the Nth GSC (GSC(N)) 114 that also operates similarly to the first GSC 110 and includes packet analyzer 144, output ports 154, and session table 124 having entries 134. Collectively, the multiple GSCs 110/112/114 manage user sessions and can be configured to send GTP packets associated with each user session to one or more of the GTP packet destinations 160, such as for example, a one or more network management or monitoring tools connected to the GSCs 110/112/114.

In operation, when a session is first created by a GTP-C packet, the F-TEID for that packet will not previously be associated with one of the GSCs 110/112/114. Thus, when the pre-sorter 104 determines that a new session is being created, the pre-sorter 104 assigns the new session to one of the GSCs 110/112/114 and sends the GTP-C session creation packet to that GSC. As noted above, the pre-sorter 104 can determine whether or not GTP-C packets are creating new sessions by looking for IMSI data within the packet as the presence of IMSI data indicates that a session is being created. Message type and/or other information can also be used as an indication of new sessions, if desired. The selected GSC 110/112/114 will receive the packet, process the packet, and update the user sessions tracked within its internal session table 130/132/134 to associate the F-TEID for the GTP packet with this new session. The GSC 110/112/114 will then send a control message representing the F-TEID for the user session to the pre-sorter 104. The pre-sorter 104 will make modifications to the pre-sort table(s) 106 accordingly so that entries 108 will associate the F-TEID for the new user session with the GSC to which the session belongs. When further GTP packets are received for the same session, the pre-sorter 104 uses the entry in the pre-sort table(s) 106 to determine the GSC that is controlling this session. The pre-sorter 104 will then forward the packet to the same GSC. This GSC will then process the new packet, make any needed updates to its internal session table 130/132/134, and send the updates to the pre-sorter 104. Thus, each GSC 110/112/114 will continuously add, modify, and remove F-TEIDs in its internal session tables 130/132/134 when new bearers are activated, modified, and deleted. These updates will also be sent as control messages to the pre-sorter 104 so that the pre-sorter table(s) 106 can also be updated to contain entries 108 correctly associating the F-TEIDs with the appropriate GSC 110/112/114.

It is note that entries 108 can be deleted from the pre-sorter table(s) 106 when F-TEIDs are deleted. As one example, the GSC for a deleted F-TEID can send a delete message to the corresponding pre-sorter 104 when an F-TEID is deleted. As another example, each GSC can send out periodic updates to the pre-sorter 104 for all F-TEIDs that are active within the GSC. The pre-sorter 104 can then update its pre-sort table(s) 106 to remove any entries that are no longer active. Alternatively, the pre-sorter 104 can keep track of which table entries are being used for forwarding packets and can remove any entry that has not been used within some selected time-out period. However, because bearers can be idle for long periods of time, this time-out value would preferably be selected to be relatively long, which means old entries will remain in the pre-sort table(s) 106 for a long time, thereby increasing the required table size. As such, an active deletion mechanisms through control messages from the GSCs are preferable.

TABLE 1 below provides an example embodiment for entries 108 that can be stored within the pre-sort table(s) 106 that associate F-TEIDs with GSCs that are controlling sessions having those F-TEIDs. TABLE 1 allows a simple lookup to be performed using the F-TEID for a packet to determine what GSC is to receive the packet. As describe herein, control messages from the GSCs 110/112/114 are used to determine the entries 108 for the pre-sort table(s) 106. It is further noted that while volatile memories are typically faster and can be used for standard operations to store the pre-sort table(s) 106, the entries within the pre-sort table(s) 106 can be stored in non-volatile storage, if desired, so that they can be reloaded if needed. For example, to enhance reboot after a power failure or reset, the entries within the pre-sort table(s) 106 can be periodically stored in a non-volatile storage medium, such as a hard drive or FLASH drive, and these entries can be reloaded into the pre-sort table(s) upon restart of the pre-sorter 104.

TABLE 1

EXAMPLE PRE-SORT TABLE ENTRIES

| Packet F-TEID | Destination |
|---|---|
| F-TEID1 | GSC2 |
| F-TEID2 | GSC1 |
| F-TEID3 | GSC1 |
| F-TEID4 | GSC(n) |
| . . . | . . . |
| F-TEID(n) | GSC2 |

TABLE 2 below provides an example embodiment for entries 130/132/134 that can be stored within the session tables 120/122/124 for the GSCs 110/112/114 that associate F-TEIDs with user sessions being controlled by each GSC. TABLE 2 allows a simple lookup to be performed using the F-TEID for a packet to determine to which session the F-TEID belongs. The GSCs 110/112/114 can use this lookup to send F-TEIDs for a given user session to the same output port.

TABLE 2

EXAMPLE SESSION TABLE ENTRIES

| Packet F-TEID | User Session |
|---|---|
| F-TEID1 | SESSION2 |
| F-TEID2 | SESSION1 |
| F-TEID3 | SESSION1 |
| F-TEID4 | SESSION(n) |
| . . . | . . . |
| F-TEID(n) | SESSION2 |

As indicated above, the one or more pre-sort table(s) 106 can be implemented as a plurality of local pre-sort tables within a plurality of pre-sort modules. For example, the entries in TABLE 1 can be stored in plurality of different local pre-sort tables that are used by these pre-sort modules to determine GSCs that should receive the received GTP packets.

Figure 2:
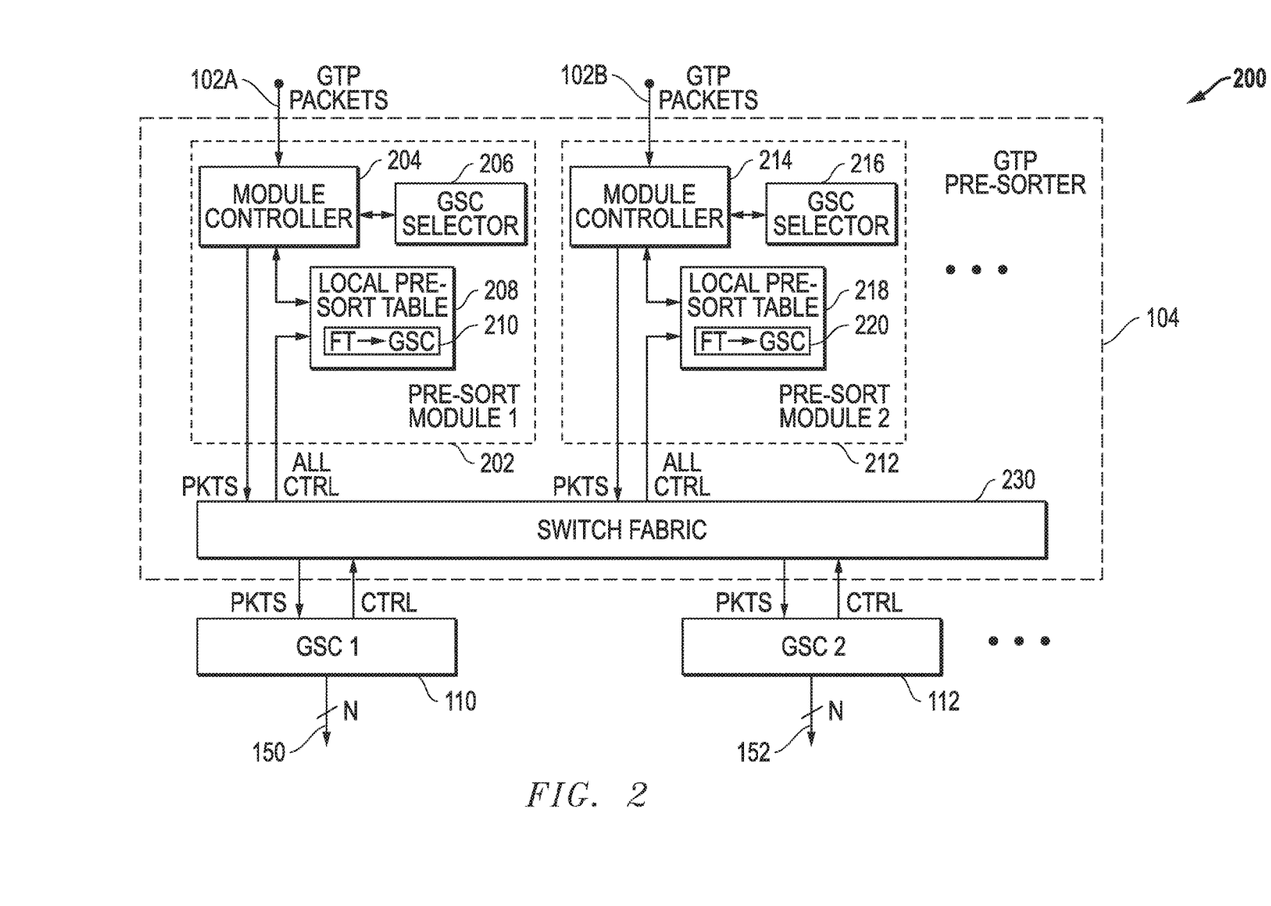
FIG. 2 is a block diagram of an example embodiment for a pre-sorter that includes multiple pre-sort modules that store entries within local pre-sort tables.

FIG. 2 is a block diagram of an embodiment for a system 200 using a GTP pre-sorter 104 that includes multiple pre-sort modules 202/212 to distribute GPT packets to GSCs 110/112. For the embodiment 200 depicted, the pre-sorter 104 includes multiple pre-sort modules represented by pre-sort modules 202 and 212, and each pre-sort module 202/212 includes a local pre-sort table 208/218. In particular, the first pre-sort module 202 includes a module controller 204 that receives and analyzes GTP packets 102A from a first input port. If a GTP control packet indicates that a new session is being created, a local GSC selector 206 is used to select a GSC to receive the packet. For other packets, the module controller 204 determines a F-TEID for the packet and accesses the local pre-sort table 208 to determine which GSC is associated with that F-TEID and should receive the packet. As described herein, the GSCs are configured to send control messages to the pre-sorter 104 to at least in part determine the F-TEID entries 210 stored in the local pre-sort table 208. The second pre-sort module 212 receives GTP packets 102B from a second input port. The second pre-sort module 212 operates similarly to the first pre-sort module 202 and includes module controller 214, local GSC selector 216, and local pre-sort table 218 including entries 220 associating F-TEIDs with GSCs. Additional pre-sort modules could also be included, as desired. A switch fabric 230 within the pre-sorter 104 receives the processed packets from the pre-sort modules 202/212 and provides them to the appropriate GSC. As shown, the pre-sorter 104 is coupled to a plurality of different GSCs as represented by GSCs 110 and 120.

It is noted that the pre-sort modules 202/212 can be configured to add routing information to the GTP packets and/or encapsulate the GTP packets so that the switch fabric 230 can determine which output port is to receive the GTP packet, and the output ports can be configured to remove this data/encapsulation prior to forwarding the GTP packets on to the GSCs. It is also noted that the GSC selectors 206/216, which in effect distribute the function of selector 107 in embodiment 100, can similarly utilize load balancing algorithms to select the GSCs to receive new user sessions. It is further noted that for the embodiment 200 of FIG. 2, each pre-sort module 202/212 includes a local pre-sort table 208/218 with F-TEID entries for all GSCs 110/112, because it is unknown which pre-sort module 202/212 will receive a given packet from input ports for the pre-sorter 104. As such, the table size for the local pre-sort tables 208/218 will grow as the number of sessions and F-TEIDS increase.

To reduce the size of the pre-sort tables 208/218, the pre-sorter 104 can be implemented as a two stage pre-sorter. The first stage of the pre-sorter can include module selectors that operate to distribute the incoming GTP packets to the pre-sort modules, which provide the second stage.

FIG. 3 provides an example embodiment 300 for such a two-stage pre-sorter 104. Rather than have each of the local pre-sort tables 208/218 store the F-TEIDs for all of the GSCs 110/112, the pre-sort tables 208/218 become N separate tables for the N separate pre-sort modules 202/212 within the pre-sorter 104. Each pre-sort table 208/218 can then be configured to store only a subset (e.g., SUB1, SUB2, . . . ) of the F-TEIDs for the GSCs 110/112. A selection algorithm (ALG) 312, such as a hash algorithm applied to F-TEIDs or other desired selection algorithm, is used by module selectors 302/304 to distribute the GTP packets across the different pre-sort modules 202/212, preferably to evenly split the F-TEIDs stored by the local pre-sort tables 208/218. In operation, the first stage that includes the module selectors 302/304 will send a GTP packet to one of the pre-sort modules 202/212 in the second stage based upon the selection algorithm 312. The local pre-sort table 208/218 within that pre-sort module 202/212 will then be used to send the packet to the correct GSC 110/112. Advantageously, only the pre-sort module 202/212 storing information for a particular F-TEID will need to be updated by the GSCs 110/112 when changes are made to that F-TEID.

It is noted that the first forwarding stage with the module selectors is static in that it is based upon a hash algorithm and/or another selection algorithm that utilizes the contents of an incoming GTP packet to select the pre-sort module to receive the packet. The second forwarding stage with the pre-sort modules is dynamic in that it is based upon dynamically updated local pre-sort tables. It is also again noted that the selection algorithm can be, for example, an algorithm based upon the F-TEID value for the packet, a hash algorithm applied to the F-TEID or portions or combined portions of packet contents, and/or any other desired selection algorithm. Preferably, the selection algorithm will be configured to balance the incoming GTP packets to the pre-sort modules.

Looking back to FIG. 3 and example embodiment 300, two-stage pre-sorter 104 includes one or more module selectors 302/304 that utilize a selection algorithm (ALG) 312 to send GTP packets to particular pre-sort modules 202/212. A first module selector 302 receives GTP packets 102A from a first input port and applies the selection algorithm (ALG) 312 to each GTP packet to determine which of the pre-sort modules will receive the GTP packet. For example, the selection algorithm 312 can be a hash algorithm that is applied to the F-TEID for each GTP packet. The switch fabric 306 then provides the GTP packets to the appropriate pre-sort module based upon the result of the selection algorithm 312. The second module selector 304 receives GTP packets 102B from a second input port and operates similarly to the first module selector 302 to apply selection algorithm (ALG) 312 to each GTP packet it receives in order to determine which pre-sort module will receive the packet. While the selection algorithm used by the different module selectors 302/304 could be different, the selection algorithms are preferably a common selection algorithm, and this selection algorithm is preferably configured to balance the GTP packets among the pre-sort modules 202/212. It is further noted that the module selector 302/304 can be configured to add routing information to the GTP packets and/or encapsulate the GTP packets so that the switch fabric 306 can determine which pre-sort module to receive the GTP packet, and the pre-sort modules can be configured to remove this data/encapsulation.

For embodiment 300, the pre-sort modules 202/212 and the switch fabric 230 are configured to operate the same as describe above for embodiment 200 except that the local pre-sort tables (PSTs) 208/218 store only a subset (SUB1, SUB2, . . . ) of the F-TEIDs for the GSCs 110/112. The GSCs 110/112 also operate as described above except that they utilize selection algorithm 312 to determine which pre-sort module should receive an F-TEID update for a given GTP packet. While a different selection algorithm could be utilized, the selection algorithm 312 used by the GSCs 110/112 to determine which pre-sort module should receive the F-TEID control message for a given GTP packet 316/318 is preferably the same selection algorithm 312 used by the module selectors 302/304 to choose the pre-sort module that initially received the GTP packet. In this way, the local pre-sort tables 208/218 for each of the pre-sort modules 202/212 need only store F-TEID entries for GTP packets it will receive according to the selection algorithm 312. As such, the pre-sort tables 208/218 will store subsets (SUB1, SUB2, . . . ) of the F-TEID entries and will have reduced sizes as compared to the pre-sort tables for embodiment 200.

During operation, a GTP packet is received on an input port for the two-stage GTP pre-sorter 104. The selection algorithm 312 is applied to the F-TEID for the packet (e.g., the F-TEID itself, a hash of the F-TEID, and/or some other algorithm), and the result is used to determine which pre-sort module 202/212 will receive the packet. As the GSCs 110/112 are also using the algorithm 312 to determine which pre-sort module 202/212 will receive a control message for a packet, the local pre-sort table 208/218 for the selected pre-sort module is expected to have an entry for the F-TEID for the packet. When the packet is received by the pre-sort module 202/212, the F-TEID is used for a lookup within the pre-sort table 208/218, and the result determines to the GSC 110/112 to which the packet is forwarded. This GSC 110/112 will then process the new packet, make any needed updates to its internal session table, and send any updates to the pre-sort module 202/212 that provided the packet. The GSCs 110/112 use the selection algorithm (ALG) 312 that was used by the module selectors 302/304 to determine which pre-sort module 202/212 should receive the F-TEID update control message. Thus, each GSC 110/112 will continuously add, modify, and/or remove F-TEID entries within its internal session table 130/132/134 when new bearers are activated and deleted, and updates are communicated to the correct pre-sort module 202/212 based upon the algorithm 312. For example, when an F-TEID entry is added in a session table for a GSC, a control message is sent to the pre-sort module that forwarded the packet to add an entry within the local pre-sort table for that pre-sort module to associate the F-TEID with the appropriate GSC. It is further noted that as described above, the pre-sort modules can use selectors to determine which GSC should receive GTP-C packets that indicate creation of a new session.

TABLE 3 below provides an example for entries stored within the local pre-sort tables 208/218 for embodiment 300 in FIG. 3 where a selection algorithm (ALG) 312 is used to distribute GTP packets to the pre-sort modules 202/212. TABLE 3 allows a simple lookup to be performed using the F-TEID for a packet to determine which GSC is to receive the packet. As describe herein, the distributed pre-sort tables of embodiment 300 include only a subset (e.g., SUB1, SUB2, . . . ) of the F-TEIDs for the GSCs 110/112. As a simplified example, the first subset (SUB1) table in TABLE 3 below includes odd F-TEIDs, and the second subset (SUB2) table in TABLE 3 below includes even F-TEIDs. It is again noted that while volatile memories are typically faster and can be used for standard operation to store entries for the pre-sort tables, the entries within the distributed pre-sort table(s) can be stored in non-volatile storage, if desired, so that they can be reloaded if needed. For example, to enhance reboot after a power failure or reset, the entries within each of the local pre-sort table(s) can be periodically stored in a non-volatile storage medium, such as a hard drive or FLASH drive, and these entries can be reloaded into their respective pre-sort table upon restart of the pre-sorter 104.

TABLE 3

EXAMPLE PRE-SORT TABLE ENTRIES
FOR TWO DISTRIBUTED LOCAL PRE-SORT TABLES

| SUB1 TABLE | | SUB2 TABLE | |
|---|---|---|---|
| Packet F-TEID | Destination | Packet F-TEID | Destination |
| F-TEID1 | GSC2 | F-TEID2 | GSC1 |
| F-TEID3 | GSC1 | F-TEID4 | GSC1 |
| F-TEID5 | GSC1 | F-TEID6 | GSC(n) |
| F-TEID7 | GSC(n) | F-TEID8 | GSC2 |
| . . . | . . . | . . . | . . . |
| F-TEID(n) | GSC2 | F-TEID(n) | GSC1 |

Looking at TABLE 3, it is noted that while the F-TEIDs are distributed among the pre-sort modules 202/212, each subset table can include any of the GSCs 110/112. This is so because the module selectors 302/304 do not know which GSCs 110/112 are associated with which F-TEIDs. The algorithm (ALG) 312 is used by the module selectors 302/304 to select the pre-sort module 202/212 that will receive the GTP packet; however, the module selectors 302/304 do not store F-TEID entries that would identify which GSC will ultimately receive the GTP packet. Rather, the pre-sort tables 208/218 hold these F-TEID entries. Thus, it is only at the pre-sort modules 202/212 where it is known and determined which of the GSCs 110/112 will end up receiving a GTP packet based upon its F-TEID. It is further noted, however, that different features and variations could also be implemented for a two-stage design while still utilizing GTP packet pre-sorting as described herein.

FIG. 4 is a flow diagram of an embodiment 400 for pre-sorting GTP packets that are distributed to multiple GSCs. Blocks 402 are performed within the pre-sorter. A GTP packet is received by a pre-sorter in block 404. In block 406, a determination is made whether or not the GTP packet represents the creation of a new session. As described above in one example, this determination can be made by determining if the GTP packet includes IMSI data, by looking at message type, and/or by using some other desired technique. If the determination in block 406 is "NO," then flow passes to block 410 where the GTP packet is sent to a GSC based upon entries within the pre-sort table(s). If the determination in block 406 is "YES," then flow passes to block 408 where the new session GTP packet is assigned to a GSC and then sent to that GSC. Flow then passes to process blocks 422 that are performed within the GSC that receives the GTP packet.

Looking to process blocks 422, flow from block 410 passes to block 414 where a determination is made whether the received GTP packet represents a new, modified, or deleted F-TEID. As described above, this determination can be made by analyzing GTP control packets (GTP-C) that are received by the GSC. If "NO," then flow passes to block 420 where the packet is processed and sent out to an external device connected to the GSC. If "YES" and an F-TEID change has occurred, then flow passes to block 416 where a control message is sent from the GSC to the pre-sorter providing an F-TEID update. An update is then made to the pre-sort table(s) within the pre-sorter in block 412. Flow passes from block 416 to block 418 where the local session table for the GSC is updated with respect to changes detected in the F-TEID for the session being controlled by the GSC. Flow then passes to block 420 where the packet is processed and sent out to an external device connected to the GSC.

It is noted that process blocks within dashed box 402 are performed by the GTP pre-sorter, and process blocks within dashed box 422 are performed by the GSC receiving the GTP packet from the pre-sorter. Different and/or additional process blocks could also be utilized while still utilizing GTP packet pre-sorting as described herein to facilitate the scaling of multiple GTP session controllers.

FIG. 5 is a more general block diagram of an example embodiment for a system 500 including a GTP pre-sorter 104 that distributes GTP packets to multiple output ports 514 that are coupled to external systems, such as GTP session controllers, network monitoring tools, and/or other desired external systems. As described above, the pre-sorter 104 receives GTP packets 102 from one or more input ports that can be coupled to one or more GTP packet sources. The GTP pre-sorter 104 uses pre-sort table(s) 106 to determine where to send the GTP packets it receives. The entries 108 stored within the pre-sort table(s) 106 associate F-TEIDs with output ports 514 for the pre-sorter 104 and thereby to external systems coupled to those output ports. The port selector 107 is configured to identify new sessions and allocate them to one of the output ports 514. As further described above, the port selector 107 can be configured to utilize load balancing algorithms and/or other desired algorithms to select the output port to receive a new user session. As indicated above, the output ports 514 are coupled to external systems, such as GTP session controllers, network monitoring tools, and/or other desired external systems. As further described above, the pre-sorter 104 receives control (CTRL) messages 516 from one or more external systems, and these control messages 516 at least in part determine the entries 108 stored within the pre-sort table(s) 106.

Although embodiments are described above where the output ports for the pre-sorter 104 are coupled to one or more GSCs that then distribute packets to additional external systems such as network monitoring tools, the pre-sorter embodiments described herein can also be used to pre-sort GTP packets for output to other external systems. For example, the pre-sorter 104 can be used to output GTP packets directly to network monitoring tools coupled to the output ports for the pre-sorter 104 rather than having those packets first pass through one or more GSCs. With respect to the tables described above where GSCs are coupled to the output ports 514 for the pre-sorter 104, it is noted that the selection of an output port would in effect also select the GSC coupled to that output port. As such, the GSC indications in TABLE 1 can also be considered to be PORT indications and vice versa. Similarly, with respect to embodiment 500, the entries 108 for the pre-sort table 106 can associate F-TEIDs with output ports, as the selection of an output port effectively selects the external system coupled to the output port.

Example TABLE 4 below includes output port designations (PORT) within the entries 108 that can be stored with the pre-sort table(s) 106 for embodiment 500. Further, as noted above, the entries within the pre-sort table(s) can be stored in non-volatile storage, if desired, so that they can be reloaded if needed. As also described above, the one or more pre-sort table(s) 106 can be implemented as a plurality of local pre-sort tables within a plurality of pre-sort modules as shown with respect to FIGS. 2-3.

TABLE 4

EXAMPLE PRE-SORT TABLE ENTRIES

| Packet F-TEID | Destination |
|---|---|
| F-TEID1 | PORT2 |
| F-TEID2 | PORT1 |
| F-TEID3 | PORT1 |
| F-TEID4 | PORT(n) |
| ... | ... |
| F-TEID(n) | PORT2 |

FIG. 6 is a flow diagram of an example embodiment 600 for pre-sorting GTP packets that are distributed to external systems, such as GTP session controllers (GSCs), network monitoring tools, and/or other desired external systems. Embodiment 600, which is directed more generally to external systems, is similar to embodiment 400 of FIG. 4, which is directed more specifically to GSCs being coupled to the pre-sorter. As with blocks 402 in FIG. 4, blocks 602 in FIG. 6 are performed within the pre-sorter. A GTP packet is received by a pre-sorter in block 604. In block 606, a determination is made whether or not the GTP packet represents the creation of a new session. As described above, this determination can be made by determining if the GTP packet includes IMSI data, by looking at message type, and/or by using some other desired technique to identify new sessions. If the determination in block 606 is "NO," then flow passes to block 610 where the GTP packet is sent to an output port based upon entries within the pre-sort table(s). If the determination in block 606 is "YES," then flow passes to block 608 where the new session GTP packet is assigned to an output port, which effectively assigns it to an external system. The GTP packet is then sent to that output port for receipt by the external system coupled to that output port. Flow then passes to blocks 622 that are performed within the external system receiving the GTP packet.

Looking to process blocks 622, flow from block 610 passes to block 614 where a determination is made whether the received GTP packet represents a new, modified, or deleted F-TEID. As described above, this determination can be made by analyzing GTP control packets (GTP-C) that are received by the GSC. If "NO," then flow passes to block 620 where the packet is processed by the external system. If "YES" and an F-TEID change has occurred, then flow passes to block 616 where a control message is sent from the external system to the pre-sorter providing an F-TEID update. An update is then made to the pre-sort table(s) within the pre-sorter in block 612. Flow passes from block 616 to block 618 where the local session table for the external system is also updated with respect to changes detected in the F-TEID for the session being processed by the external system. Flow then passes to block 620 where the packet is processed by the external system and/or other systems, as desired.

It is noted that process blocks within dashed box 602 are performed by the GTP pre-sorter, and process blocks within dashed box 622 are performed by the external system receiving the GTP packet from the pre-sorter. Different and/or additional process blocks could also be utilized while still utilizing GTP packet pre-sorting as described herein to facilitate distribution of GTP packets to external systems, such as GTP session controllers, network monitoring tools, and/or other desired external systems.

FIG. 7 is block diagram of an example embodiment 700 for a system including a GTP pre-sorter 104 that distributes GTP packets to multiple output ports coupled to external systems. Embodiment 700 is similar to the embodiments described with respect to FIGS. 1-3 except that the output ports of the pre-sorter 104 are coupled to any desired set of external systems, such as GTP session controllers (GSCs), network monitoring tools, and/or other desired external systems. As such, the pre-sorter 104 for embodiment 700 operates as described above for the embodiments of FIGS. 1-3. The external systems 702/704 receive the GTP packets (PKTS) from output ports for the pre-sorter 104 also provide the control messages (CTRL) back to the pre-sorter 104 that at least in part determine the entries stored in the pre-sort tables 208/218. As described with respect to the GSC embodiments of FIGS. 1-3, the external systems 702/704 are configured to include the packet analyzers 140/142 that analyze GTP packets and the session tables 120/122, and the entries 130/132 within the session tables 120/122 associate F-TEIDs with user sessions. As with the GSCs, the systems 702/704 also utilize the session tables 120/122 to track F-TEIDs for user sessions they are processing, and the systems 702/704 provide the control messages (CTRL) to the pre-sorter 104 to identify F-TEIDS associated with user session they are processing. As above, these control messages at least in part determine the entries 210/220 within the pre-sort tables 208/218. Further, for a two-stage approach as shown for the pre-sorter 104 in embodiment 700, the systems 702/704 can also include the selection algorithm (ALG) 312 and use it to provide subsets of control messages back to particular pre-sort modules 202/212, as described above with respect to the GSCs 110/112 for the two-stage pre-sorter embodiment 300 of FIG. 3. It is noted that while a two-stage pre-sorter 104 is shown for embodiment 700, a single stage pre-sorter 104 could also be utilized, if desired, such as shown with respect to embodiment 200 of FIG. 2. Other variations could also be implemented while still utilizing the pre-sorter 104 to distribute GTP packets to external systems.

TABLE 5 below provides an example for entries that can be stored within the local pre-sort tables 208/218 for embodiment 700 in FIG. 7 where a selection algorithm (ALG) 312 is used to distribute GTP packets to the pre-sort modules 202/212. As indicated above with respect to TABLE 4, selecting an output port (PORT) for the pre-sorter 104 effectively selects the external system 702/704 coupled to that output port. Further, as noted above, the entries within the distributed pre-sort table(s) can be stored in non-volatile storage, if desired, so that they can be reloaded if needed.

TABLE 5

EXAMPLE PRE-SORT TABLE ENTRIES
FOR TWO DISTRIBUTED LOCAL PRE-SORT TABLES

| SUB1 TABLE | | SUB2 TABLE | |
|---|---|---|---|
| Packet F-TEID | Destination | Packet F-TEID | Destination |
| F-TEID1 | PORT2 | F-TEID2 | PORT1 |
| F-TEID3 | PORT1 | F-TEID4 | PORT1 |
| F-TEID5 | PORT1 | F-TEID6 | PORT(n) |
| F-TEID7 | PORT(n) | F-TEID8 | PORT2 |
| ... | ... | ... | ... |
| F-TEID(n) | PORT2 | F-TEID(n) | PORT1 |

It is also noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, programmable integrated circuitry can also be used, such as FPGAs (field programmable gate arrays), ASICs (application specific integrated circuits), and/or other programmable integrated circuitry. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs), and/or processors to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing circuitry.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A system for distributing GTP (GPRS (General Packet Radio Service) Tunneling Protocol) packets, comprising:
a pre-sorter comprising at least one of a processor or an FPGA (field programmable gate array) or an ASIC (application specific integrated circuit) programmed to determine F-TEIDs (F-tunnel endpoint identifiers) for incoming GTP packets and to forward GTP packets to output ports for the pre-sorter based upon entries within a plurality of pre-sort tables, the entries associating F-TEIDs with the output ports and each F-TEID representing a combination of a destination IP address and a tunnel endpoint identifier (TEID) for a GTP packet; and
a plurality of external systems coupled to the output ports for the pre-sorter, each of the plurality of external systems comprising at least one of a processor or an FPGA or an ASIC programmed to analyze GTP packets to determine F-TEIDs for the GTP packets associated with tracked user sessions and to send control messages to the pre-sorter to at least in part determine the entries stored within the plurality of pre-sort tables.

2. The system of claim 1, wherein the external systems comprise a plurality of GTP session controllers coupled to the output ports and having GTP packets received from the pre-sorter as outputs to a plurality of additional external systems.

3. The system of claim 1, wherein the external systems comprise a plurality of monitoring tools coupled to the output ports.

4. The system of claim 1, wherein the at least one of a processor or an FPGA or an ASIC for the external systems are further programmed to send control messages to the pre-sorter to delete entries in the plurality of pre-sort tables.

5. The system of claim 1, wherein the pre-sorter further comprises a port selector coupled to input ports for the pre-sorter, the port selector identifying new sessions for the incoming GTP packets and allocating the new sessions to the output ports.

6. The system of claim 1, wherein the at least one of a processor or an FPGA or an ASIC for the external systems are further programmed to determine whether GTP packets received by the externals systems represent new, modified, or deleted F-TEIDs.

7. The system of claim 6, wherein the control messages include F-TEID updates for the plurality of pre-sort tables for new, modified, or deleted F-TEIDs.

8. A pre-sorter for distributing GTP (GPRS (General Packet Radio Service) Tunneling Protocol) packets, comprising:
a plurality of input ports having GTP packets as inputs;
a plurality of output ports having GTP packets as outputs;
a plurality of pre-sort tables having entries associating F-TEIDs (F-tunnel endpoint identifiers) with the output ports, each F-TEID representing a combination of a destination IP address and a tunnel endpoint identifier (TEID) for a GTP packet; and
at least one controller comprising at least one of a processor or an FPGA (field programmable gate array) or an ASIC (application specific integrated circuit) programmed to determine F-TEIDs for received GTP packets and to determine the output ports to receive the GTP packets based upon the plurality of pre-sort tables, the entries within the plurality of pre-sort tables being determined at least in part by control messages received from external systems coupled to the output ports for the pre-sorter.

9. The pre-sorter of claim 8, further comprising a non-volatile storage medium, the non-volatile storage medium storing the entries for the plurality of pre-sort tables.

10. The pre-sorter of claim 8, further comprising a port selector coupled to the input ports, the port selector identifying new sessions for the incoming GTP packets and allocating the new sessions to the output ports.

11. The pre-sorter of claim 8, wherein the control messages include F-TEID updates for the plurality of pre-sort tables for new, modified, or deleted F-TEIDs determined by the external systems.

12. A method for distributing GTP (GPRS (General Packet Radio Service) Tunneling Protocol) packets comprising
receiving GTP packets with a pre-sorter having a plurality of output ports;
determining F-TEIDs (F - tunnel endpoint identifiers) for the GTP packets within the pre-sorter, each F-TEID representing a combination of a destination IP address and a tunnel endpoint identifier (TEID) for a GTP packet;
identifying the output ports to receive the GTP packets based upon entries within a plurality of pre-sort tables within the pre-sorter, the entries associating F-TEIDs with the output ports;
forwarding the GTP packets to the output ports;
receiving control messages from a plurality of external systems coupled to the output ports for the pre-sorter; and
using the control messages within the pre-sorter to at least in part determine the entries stored within the plurality of pre-sort tables.

13. The method of claim 12, wherein the control messages are received from a plurality of monitoring tools coupled to the output ports.

14. The method of claim 12, wherein the control messages are received from a plurality of GTP session controllers coupled to the output ports and having GTP packets as outputs to a plurality of additional external systems.

15. The method of claim 12, further comprising identifying new sessions for the incoming GTP packets and allocating the new sessions to the output ports.

16. The method of claim 12, wherein the control messages include F-TEID updates for the plurality of pre-sort tables for new, modified, or deleted F-TEIDs determined by the external systems.

17. The method of claim 16, further comprising updating the plurality of pre-sort tables based upon the control messages.

* * * * *